United States Patent
He et al.

(10) Patent No.: US 7,565,453 B2
(45) Date of Patent: Jul. 21, 2009

(54) SYSTEM AND METHOD FOR ACCESSING AND TRANSMITTING DIFFERENT DATA FRAMES IN A DIGITAL TRANSMISSION NETWORK

(75) Inventors: Zhiqun He, Shenzhen (CN); Yuxiang Wang, Shenzhen (CN)

(73) Assignee: Huawei Technologies Co., Ltd., Bantian, Shenzhen (CN)

( * ) Notice: Subject to any disclaimer, the term of this patent is extended or adjusted under 35 U.S.C. 154(b) by 313 days.

(21) Appl. No.: 11/334,477

(22) Filed: Jan. 19, 2006

(65) Prior Publication Data

US 2006/0123132 A1    Jun. 8, 2006

Related U.S. Application Data

(62) Division of application No. 10/765,153, filed on Jan. 28, 2004, now Pat. No. 7,016,979.

(30) Foreign Application Priority Data

Jan. 28, 2003    (CN) ................ 03 1 03271

(51) Int. Cl.
    *G06F 17/00* (2006.01)
(52) U.S. Cl. .................... 709/246; 709/203; 709/228; 714/4; 370/469
(58) Field of Classification Search .......... 709/203, 709/220, 227, 224, 246, 223, 228; 370/397, 370/539; 714/4
    See application file for complete search history.

(56) References Cited

U.S. PATENT DOCUMENTS

| 5,943,663 | A | 8/1999 | Mouradian | |
|---|---|---|---|---|
| 7,167,929 | B2 * | 1/2007 | Steinmetz et al. | 710/5 |
| 7,295,561 | B1 * | 11/2007 | Yao et al. | 370/400 |
| 7,353,321 | B2 * | 4/2008 | Steinmetz et al. | 711/100 |
| 7,366,171 | B2 * | 4/2008 | Kadambi et al. | 370/389 |
| 7,369,551 | B2 * | 5/2008 | He et al. | 370/389 |
| 2002/0176450 | A1 * | 11/2002 | Kong et al. | 370/539 |
| 2002/0181486 | A1 * | 12/2002 | Cantwell | 370/419 |
| 2003/0074469 | A1 * | 4/2003 | Busi et al. | 709/238 |
| 2003/0081685 | A1 | 5/2003 | Montgomery | |
| 2003/0123472 | A1 * | 7/2003 | Dufour et al. | 370/442 |
| 2003/0191857 | A1 * | 10/2003 | Terrell et al. | 709/244 |
| 2003/0202535 | A1 | 10/2003 | Foster et al. | |
| 2004/0085227 | A1 | 5/2004 | Mikuriya et al. | |
| 2005/0060598 | A1 | 3/2005 | Klotz et al. | |
| 2005/0076113 | A1 | 4/2005 | Klotz et al. | |

* cited by examiner

*Primary Examiner*—Khanh Q Dinh
(74) *Attorney, Agent, or Firm*—Nixon Peabody, LLP

(57) ABSTRACT

A system for accessing and transmitting data frames of different types in a digital transmission network, including: at least one user-network interface; at least one network-network interface; at least one mapping/demapping device; a virtual interface device coupled with the at least one user-network interface and with the at least one network-network interface via the at least one mapping/demapping device; and a control device coupled with the virtual interface device; the control device including: a data processing and dispatching device including: at least one inter-device interface; a data processing and dispatching unit coupled with the inter-device interface; a processing flow database, storing a plurality of processing flows, coupled with the data processing and dispatching unit; and a control interface unit coupled with the processing flow database and the data processing and dispatching unit so as to control a virtual private processing unit and a rule database to process the data frames.

6 Claims, 13 Drawing Sheets

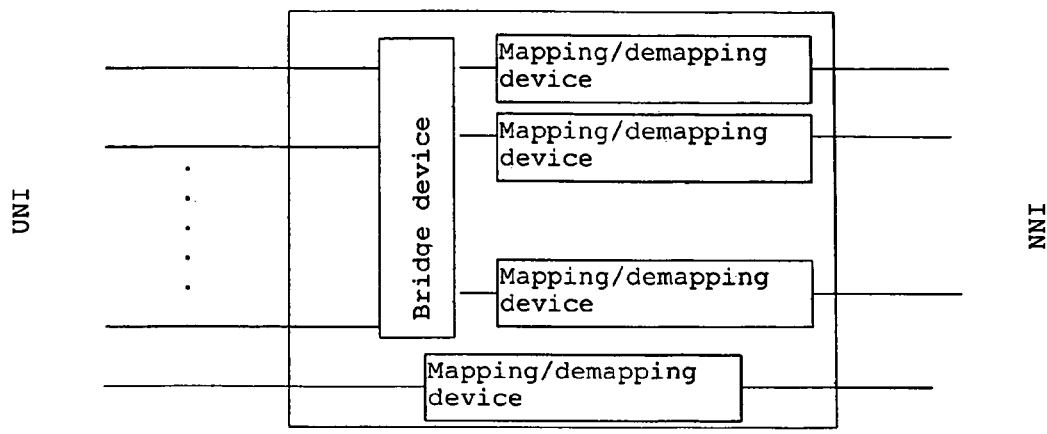
Fig. 2B    (PRIOR ART)
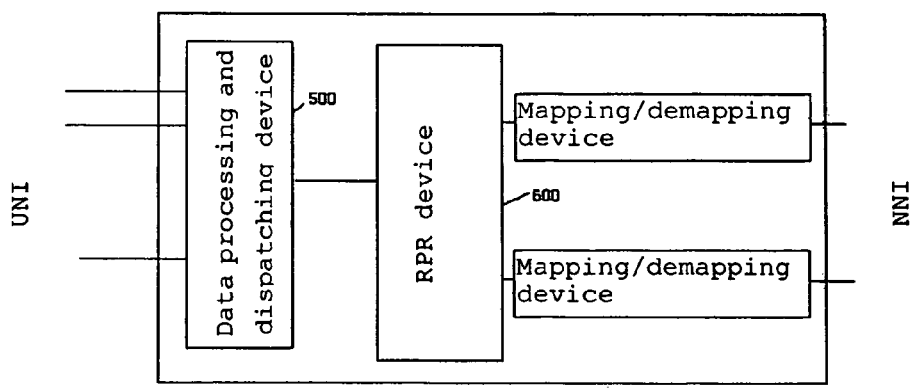
Fig. 3    (PRIOR ART)

SYSTEM AND METHOD FOR ACCESSING AND TRANSMITTING DIFFERENT DATA FRAMES IN A DIGITAL TRANSMISSION NETWORK

FIELD OF THE INVENTION

The present invention relates to a system and method of accessing and transmitting data frames, in particular to a system and method of accessing and transmitting different types of data frames in a digital transmission network.

BACKGROUND OF THE INVENTION

Providing Ethernet data services has becoming a trend for telecom operators. Because Ethernet technology is now characterized by low cost and high expansibility, it has evolved from a mainstream LAN technology to a primary data service access technology and is widely used in Metropolitan Area Network (MAN) by more and more telecom operators.

Ethernet data services can be classified into two types: Ethernet private line services and Virtual Local Area Network (VLAN) services.

Currently, however, most data transmission networks utilized by telecom operators are SDH/SONET networks. Therefore, it is naturally desirable for telecom operators and telecom equipment manufacturers to access and transfer Ethernet data frames effectively in a SDH/SONET network to meet the increasing demand for Ethernet data services. At present, several telecom equipment manufacturers have provided the devices to access and transfer Ethernet data frames in a SDH/SONET network. Those devices may be classified into 3 types according to their functional implementation:

(1) data mapping/demapping scheme;
(2) bridge scheme; and
(3) RPR scheme.

Before discussing the prior art, for convenience, the following acronyms or abbreviations used throughout this specification and their description are provided: MPLS—Multi-protocol Label Switching; GFP—General Frame Positioning; VLAN—virtual Local Area Network; VMAN—virtual Metropolitan Area Network; and RPR—Resilient Packet Ring.

FIG. 1 shows a block diagram of device according to the data mapping/demapping scheme in a first prior art. The device comprises one or more user-network interfaces (UNI) 20 (standard Ethernet interfaces), one or more network-network interfaces (NNI) 30 (synchronous digital transmission channels), one or more mapping/demapping devices 101, 102, and so one. Each of the mapping/demapping devices corresponds to a unique UNI and a unique NNI. In use, the data frames entering the device via UNI 20 and data frames output from the device comply with Ethernet data standard, and data frames entering the device via a NNI 30 and data frame output from the device comply with synchronous digital transmission network standard.

The mapping/demapping device 10 maps Ethernet data frames entering the device via UNI 20 to become synchronous digital data frames, and outputs the mapped data frames via a NNI 30. Conversely, the mapping/demapping device 10 demaps the synchronous digital data entering the device via NNI to Ethernet data frames, and outputs the data frames via the UNI. However, the functionality of the prior art device is simple, thus it can only provide Ethernet private line services.

FIG. 2A shows a block diagram of the device utilizing bridge scheme in a second prior art. The device comprises one or more UNIs 20 (i.e., standard Ethernet interfaces), each of which corresponds to a unique bridge port. The device further comprises one or more NNIs 30 (i.e., synchronous digital transmission channels). The device further comprises a bridge device 400, which is described in detail in IEEE802.1D and IEEE802.1Q standards. The bridge device 400 comprises a plurality of bridge ports, each of which corresponds to a unique UNI or a unique mapping/demapping device. Each mapping/demapping device corresponds to a unique bridge port and a unique NNI. The data frames entering the device via UNI 20 and the data frames output from the device comply with Ethernet data standard, and data frames entering the device from NNI 30 and data frame output from the device comply with the standard of synchronous digital transmission network.

Data frames entering the device via UNI 20 enter the bridge device 400 via the bridge port corresponding to the UNI. The bridge device 400 calculates the bridge output port according to the address information in the data frames and sends the data frames to the corresponding mapping/demapping device 102 via the output port (i.e., the mapping/demapping device maps the data frames and then outputs them to the NNI), and vice versa.

In the bridge scheme, usually the operator is allowed to map partial or all UNIs to mapping/demapping devices in a one to one way through configuration. In this case, the device employs both of above technical schemes, so it is called an enhanced bridge scheme. The functional model of an enhanced bridge device is shown in FIG. 2B.

The disadvantages of the second prior art are:

(1) it is unable to provide integral VLAN service. If a plurality of subscribers are attached to the device via UNIs and there are conflicts among address spaces of Ethernet data frames of those subscribers, the device is unable to isolate the conflicts effectively, thus it is unable to provide services correctly to those subscribers;
(2) a common bridge (non-enhanced bridge) is unable to provide Ethernet private line service;
(3) a UNI can only support one service type (Ethernet private line service or VLAN service), which limits the access capability of the device. In some cases, although the processing capacity of the device is sufficient, new devices have to be added to improve access capacity because the UNIs have been used up; and
(4) a NNI can only support one service type (Ethernet private line service or VLAN service), which leads to low convergence capability of the device. In some cases, in a star topology network, although the processing capacity of the device is sufficient, new devices have to be added to improve convergence capacity because the NNIs have been used up. For telecom operators, this means not only new investment but also bandwidth waste.

FIG. 3 shows a block diagram of the device utilizing RPR scheme in a third prior art. The device comprises one or more UNIs (e.g., standard Ethernet UNIs), two NNIs (i.e., synchronous digital transmission channels), and a RPR device 600, which is described in IEEE802.17 standard, two mapping/demapping devices, and a data processing device 500, which may be a data converging/deconverging device or a bridge device.

The data frames entering the device via the UNI 20 are processed as follows:

Step 1: the data processing device 500 processes the data frames (the data frames are converged if the data processing device is a data converging/deconverging device, and the data frames are switched if the data processing device is a bridge device);

Step 2: the data processing device 500 transfers the processed data frames to the RPR device 600;

Step 3: the RPR device 600 sends the data frames to the corresponding mapping/demapping device according to the address information in the data frames; and Step 4: the mapping/demapping device maps performs mapping operation for the data frames and sends them to outside of the device via the corresponding NNI.

Conversely, the data frames entering the device via the NNI are processed as follows:

Step 1: the mapping/demapping device performs demapping operation for the data frames and transfers the demapped data frames to the RPR device 600;

Step 2: the RPR device 600 processes the data frames and then sends them to the data processing device;

Step 3: the data processing device 500 processes the data frames (the data frames are deconverged if the data processing device is a data converging/deconverging device; the data frames are switched if the data processing device is a bridge device); and Step 4: the data processing device 500 finds corresponding UNI according to the address information in the data frames and then outputs the data frames via the UNI.

The disadvantages of this scheme are:

(1) it is unable to provide Ethernet private line service and VLAN service at the same time. If the data processing device is a bridge device, it doesn't support Ethernet private line service; if the data processing device is a data converging/deconverging device, it doesn't support VLAN service; and (2) it can only be used in a ring topology network.

SUMMARY OF THE INVENTION

In order to overcome disadvantages in the prior art, and in order to provide individualized service and improve the service ability of the device, it is an object of the present invention to provide a data processing and dispatching device in SDH/SONET network and the method of accessing and transmitting Ethernet data frames thereof.

According to one aspect of the present invention, it is provided a system for accessing and transmitting different data frames types in a digital transmission network in order to access and transmit different data frames, the system includes:

at least a UNI coupled with a user-network;

at least a NNI coupled with the digital transmission network to transfer data;

at least one mapping/demapping device;

a virtual interface device coupled with at least one UNI and with at least one NNI via the mapping/demapping device;

a control device coupled with the virtual interface device to control other corresponding devices to perform different data frame processing flows.

Optionally, the control device includes:

a data processing and dispatching device, including: at least an inter-device interface designed to input and output data frames; a data processing and dispatching unit coupled with the inter-device interface to input and output data frames; a processing flow database storing a plurality of processing flows and coupled with the data processing and dispatching unit so as to process data according to the processing flows; a control interface unit coupled with the processing flow database and the data processing and dispatching unit so as to control the virtual private processing unit and the rule database to process the data frames.

Preferably, the other corresponding devices include: at least a virtual private device and/or at least a virtual bridge device and/or at least a RPR device coupled with the data processing and dispatching device.

Optionally, each processing flow in the processing flow database includes: data frame type number and inter-device interface number.

Preferably, each inter-device interface of the data processing and dispatching unit corresponds to a unique external device.

Optionally, the mapping relationship between the processing flows and data frame types is 1:1, and the data processing and dispatching unit finds corresponding processing flows according to data frame types and informs corresponding device to process the data frames according to the processing flows.

Preferably, the processing flows in the processing and dispatching flow database may be established, modified, or deleted dynamically, and the data of the processing flows in the processing and dispatching flow database may be added, modified, or deleted dynamically during operation.

The present invention also provides a method of accessing and transmitting different types data frames in the system accessing and transmitting different data frames in a digital transmission network, wherein the system accessing and transmitting data frames of different types in a digital transmission network includes a data processing and dispatching device, the data processing and dispatching device comprises at least an inter-device interface, a processing flow database, and a control interface unit, the data processing and dispatching device processes the data frames received via the following steps:

extracting a type number from the data frames;

searching in the processing flow database with an index of extracted type number;

determining the retrieval result, discarding the data frames if it is blank and ending the process;

if the retrieval result is not blank, extracting the inter-device interface number from the retrieval result;

outputting the data frames via the inter-device interface with the inter-device interface number.

According to another aspect of the present invention, it is provided a method of accessing and transmitting different data frames in the system accessing and transmitting different data frames in a digital transmission network, the data frames entering the system via a UNI are processed through the following steps:

performing matching operation for the data frames according to classifying rules;

modifying the data frames according to the predefined classifying rules, i.e., inserting data type number in the data frames;

transferring the modified data frames to the data processing and dispatching device;

searching for corresponding processing unit according to the data type number in the data frames;

transferring the data frames to the found processing unit;

determining whether the found processing unit is a virtual interface device;

if the found processing unit is not a virtual interface device, then processing the data frames by the found processing unit;

modifying the data type number of the data frames;

transferring the modified data frames to the data processing and dispatching device;

returning to the step of searching for the corresponding processing unit according to the data type number in the data frames, and searching for the corresponding processing unit again;

if the found processing unit is a virtual interface device, the using the virtual interface device and searching for corresponding device interface according to the data type number in the data frames;

using the virtual interface device for modifying the data frames, i.e., deleting the data type number from the data frames;

using the virtual interface device for transferring the modified data frames to corresponding device interface (UNI or network-network device) in order to output the modified data frames via the interface.

Optionally, the step of the virtual interface device transferring the modified data frames to corresponding device interface further comprises mapping the data frames if the data frames are transferred to an network-network.

Preferably, the step of processing the data frames entering the system via a NNI further comprises the step of demapping the data frames.

The system and method according to the present invention have the following advantages:

(1) with the system and method of the present invention, operators can adjust the processing flow in the device flexibly according to the network topology, subscribers' requirements and bandwidth resource etc, thus the processing ability and efficiency of bandwidth can be improved;

(2) with the system and method of the present invention, fast and individualized service can be provided for subscribers. Operators can provide new services for subscribers through establishing new processing flow combination when the system is not upgraded and new devices are added.

Other features, attainments, and advantages will become apparent to those skilled in the art upon a reading of the following description when taken in conjunction with the accompanying drawings.

BRIEF DESCRIPTION OF THE DRAWINGS

FIG. 2B shows the block diagram of the enhanced bridge scheme according to the second prior art;

FIG. 3 shows the block diagram of RPR scheme according to the third prior art;

DETAILED DESCRIPTION OF EMBODIMENTS

To facilitate the explanation of the system and method of the present invention, the basic function of the device is described first.

Usually, a computing device has the following three functions:

(1) input function for receiving external information;
(2) processing function for process the external information;
(3) output function for outputting the processed information.

For a device accessing and transmitting Ethernet data frames in a SDH/SONET network the following functions are included:

(1) input function: for receiving external information via the UNIs and the NNIs;
(2) output function: for outputting the processed information via the UNI and the NNI;
(3) processing function: for a device accessing and transmitting Ethernet data frames in a SDH/SONET network, different processing ability as well as service ability and service efficiency depend on different technical schemes.

In addition, the phrase "standard Ethernet interface" used in the present invention means the following: IEEE802.3 defines the LAN interface in detail. Such an interface is regarded as a standard Ethernet interface in the present invention.

The present invention will be described hereunder with reference to the drawings. For the sake of brevity, components and units described in prior art will not be further described in detail hereafter, and components and units described above will not be described again in detail hereunder.

Figure 1:
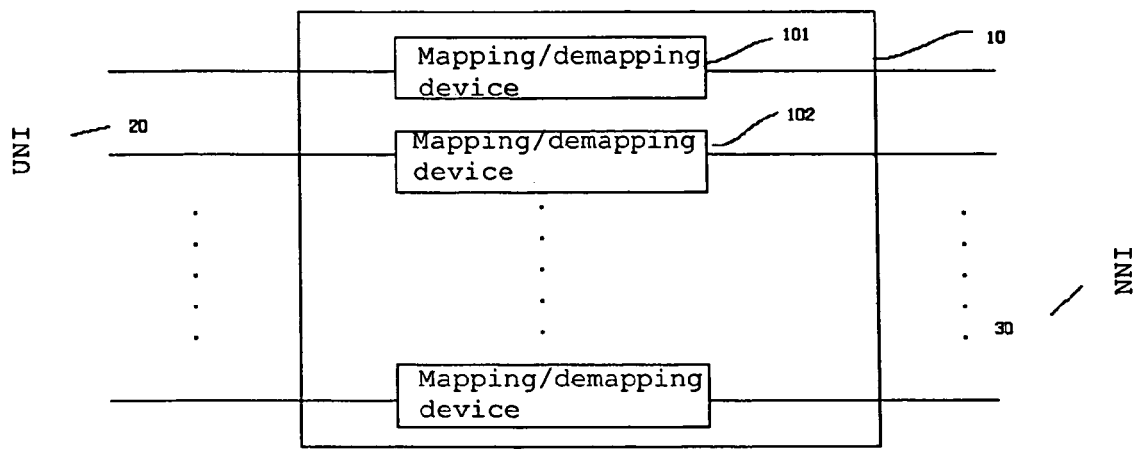
FIG. 1 shows the block diagram of the data mapping/demapping scheme according to the first prior art.
Figure 2A:
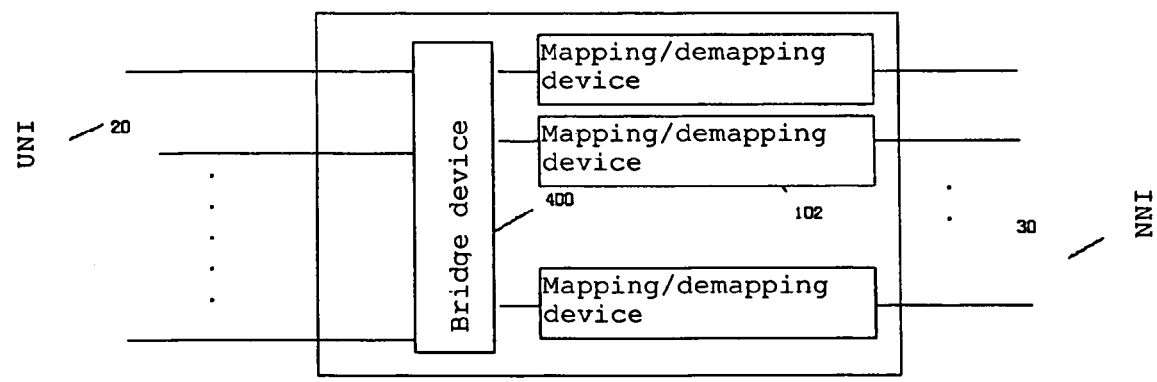
FIG. 2A shows the block diagram of the bridge scheme according to the second prior art.
Figure 4A:
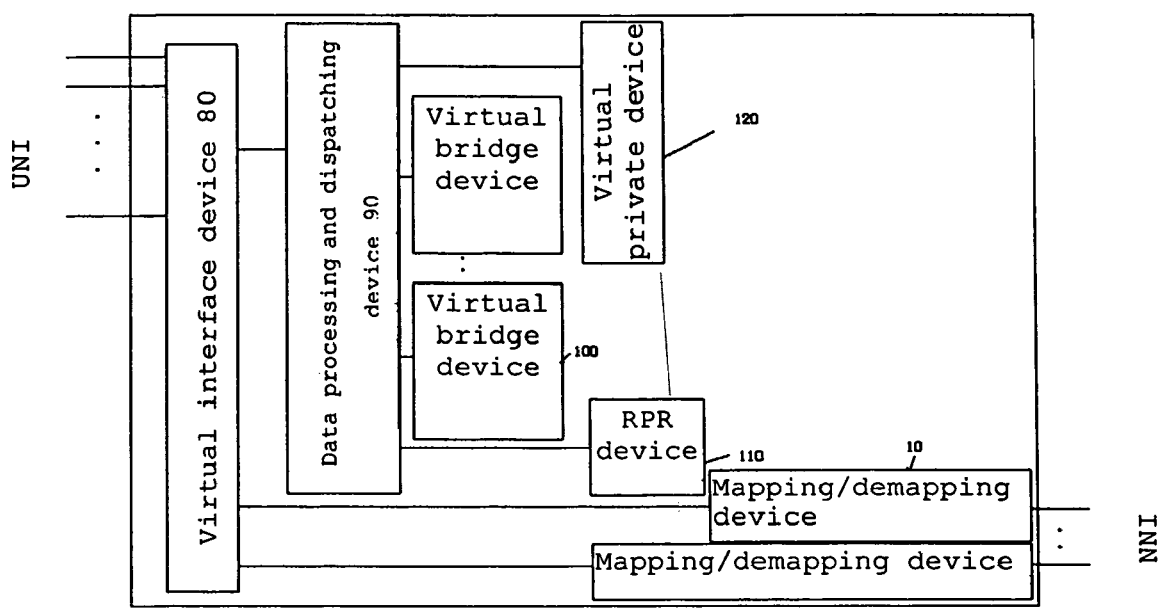
FIG. 4A shows the schematic diagram of a preferred embodiment of the system accessing and transmitting Ethernet data frames in a SDH/SONET network according to the present invention.

FIG. 4A shows a system that accesses and transmits different data frames in a digital transmission network. The system comprises a plurality of UNIs designed to couple with the subscribers' networks, a plurality of NNIs designed to couple with the digital transmission network to transmit data, a plurality of mapping/demapping devices 10, a virtual interface device 80 coupled with the UNIs and also coupled with the NNIs via the mapping/demapping devices 10, a data processing and dispatching device 90 coupled with the virtual interface device 80, a plurality of virtual private devices 120 and a virtual bridge device 100 and a RPR device 110 coupled with the data processing and dispatching device. Although a plurality of virtual private device 120, a virtual bridge device 100 and a RPR device 110 are described in the present invention, it should be noted that in fact the combination of any one or two of them may be used to implement the present invention. The input to the system comprises: (1) data frames entering the system via the UNIs; and (2) data frames entering the system via the NNIs. The data frames output from the system comprises: (1) data frames from the UNIs; and (2) data frames from the NNIs.

Figure 4B:
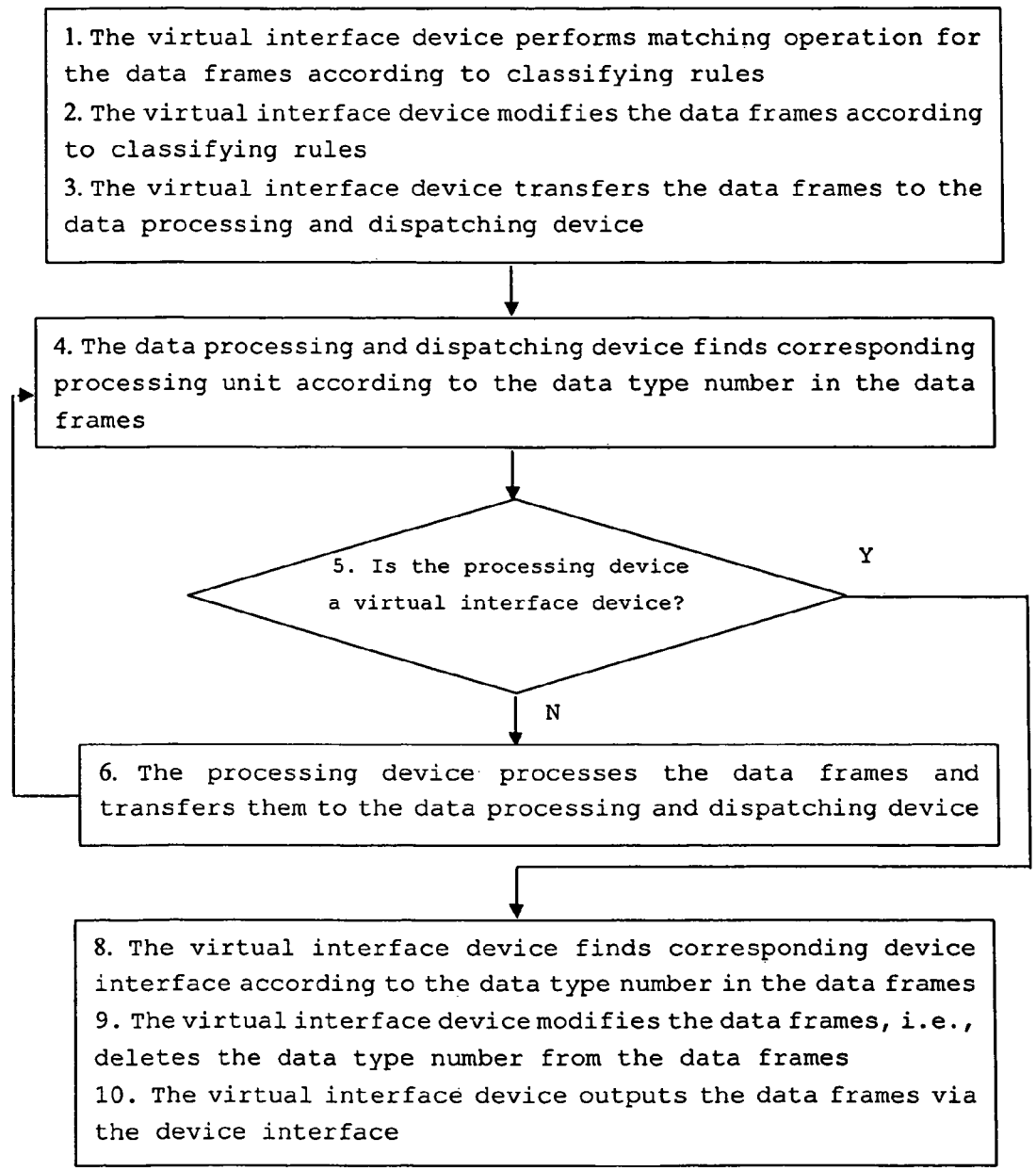
FIG. 4B shows the data processing flowchart of a preferred embodiment of the system accessing and transmitting Ethernet data frames in a SDH/SONET network.

FIG. 4B shows the processing steps for data frames entering the system via the UNIs. The steps are as follows:

Step 1: the virtual interface device performs matching action to the data frames according to classifying rules;

Step 2: the virtual interface device modifies the data frames according to classifying rules, i.e., inserts data type number in the data frames;

Step 3: the virtual interface device transfers the modified data frames to the data processing and dispatching device;

Step 4: the data processing and dispatching device finds corresponding processing device according to the data type number in the data frames;

Step 5: the data processing and dispatching device transfers the data frames to the corresponding processing device. If the corresponding processing device is a virtual interface device, then the processing goes to step 8;

Step 6: the corresponding processing device processes the data frames and modifies the data type number at the end of the processing, and then transfers the modified data frames to the data processing and dispatching device;

Step 7: the processing goes to step 4;

Step 8: the virtual interface device finds corresponding device interface according to the data type number in the data frames;

Step 9: the virtual interface device modifies the data frames, i.e., deletes the data type number from the data frames; and Step 10: the virtual interface device outputs the modified data frames via the device interface (if the device interface is a NNI, mapping operation should be performed through the mapping/demapping device before output).

The processing steps for data frames entering the device via the NNI are as follows:

Step 1: the mapping/demapping device performs demapping operation to the data frames; and Step 2: the remaining processing steps are identical to those for data frames entering the system via the UNIs.

Figure 7A:
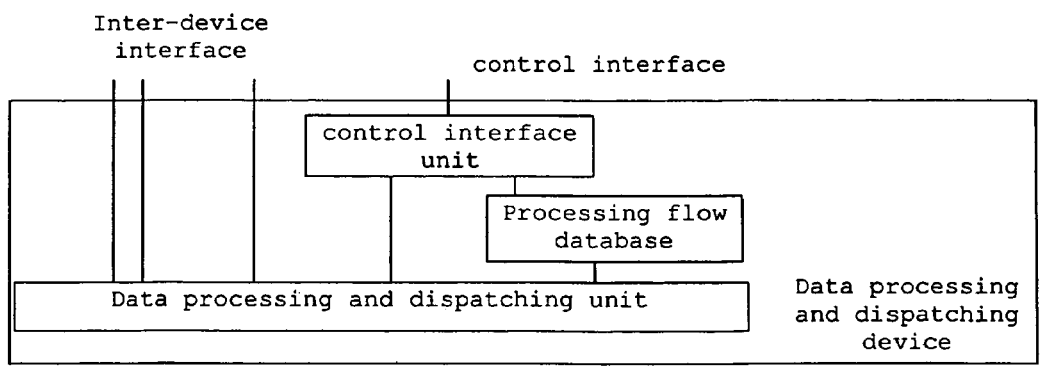
FIG. 7A shows the schematic block diagram of the data processing and dispatching device in a preferred embodiment of the system accessing and transmitting Ethernet data frames in a SDH/SONET network according to the present invention.

FIG. 7A shows the schematic block diagram of data processing and dispatching device in a preferred embodiment of the system accessing and transmitting Ethernet data frames in a SDH/SONET network according to the Present invention. The data processing and dispatching device is coupled with a plurality of inter-device interfaces to process the data from the inter-device interfaces. The data processing and dispatching device is also coupled with the processing flow database and the control interface unit. The control interface unit exchanges data with outside world via the control interface.

The present invention utilizes the data processing and dispatching device to implement individualized services to improve equipment serviceability. The data processing device stores a plurality of processing flows. The mapping relationship between the processing flows and the data frame types is 1:1. The data processing and dispatching device finds corresponding processing flow according to data frame type, and informs other devices to process the data frames according to the processing flow. The processing flows in the data frame processing device may be set up, edited, or deleted dynamically. During operation of the system, the operator may quickly provide individualized services to maximize the efficacy of the system through adding, editing, and deleting the processing flows in the data processing device.

The data processing and dispatching device is the processing center of the system, and the processing flows are embedded therein as firmware. There are a plurality of inter-device interfaces in the data processing and dispatching device, each of which maps to a unique external device. The mapping relationship between the inter-device interfaces and the external devices are fixed.

The processing flow database is the control center of the system, and the items in the database may be updated dynamically. Each processing flow in the processing flow database contains the following information:

(a) data frame type number; and (b) inter-device interface number.

The data processing and dispatching device is connected to other devices via the inter-device interfaces, each of the inter-device interfaces maps to a virtual bridge device, a virtual private device, a RPR device, or a virtual interface device. The data processing and dispatching device is connected to the control system of the device via the control interface.

Figure 7B:
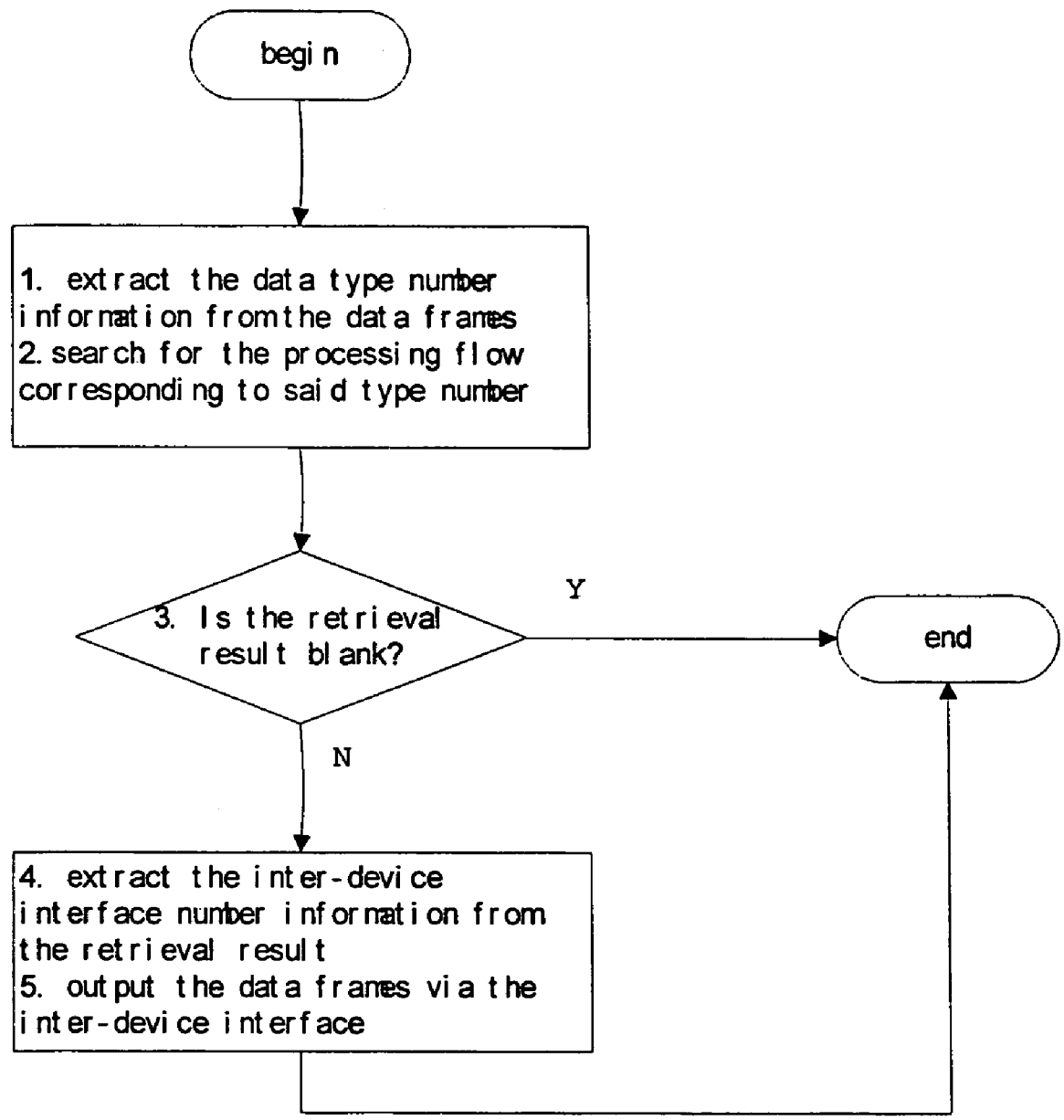
FIG. 7B shows the flowchart of the data processing and dispatching device processing the entered data in a preferred embodiment of the system accessing and transmitting Ethernet data frames in a SDH/SONET network according to the present invention.

FIG. 7B shows the flowchart of the data processing and dispatching device processing the data entering the device in a preferred embodiment of the system accessing and transmitting Ethernet data frames in a SDH/SONET network according to the present invention. The processing steps are as follows:

Step 1: extracting the type number from the data frames;

Step 2: searching in the processing flow database with the index of the extracted type number;

Step 3: determining the searching result; if it is blank, discarding the data frames and going to step 6;

Step 4: extracting inter-device interface number from the searching result;

Step 5: outputting the data frames via the inter-device interface corresponding to the inter-device interface number; and Step 6: ending.

Figure 4C:
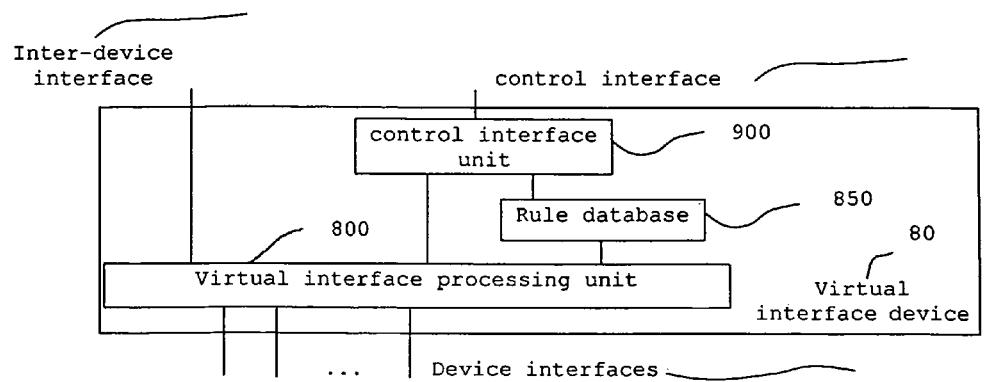
FIG. 4C shows the schematic block diagram of virtual interface device in a preferred embodiment of the system accessing and transmitting Ethernet data frames in a SDH/SONET network according to the present invention.

FIG. 4C shows the schematic block diagram of virtual interface device in a preferred embodiment of the system accessing and transmitting Ethernet data frames in a SDH/SONET network according to the present invention. A virtual interface device 80 is used to enhance access ability. Via the virtual interface device 80, a device interface (UNI 20 or NNI 30) may be expanded to a plurality of virtual interfaces, each of which supports specific subscribers and services. For data frames entering the system via the device interfaces (UNI 20 and NNI 30), the virtual interface processing unit 800 of the virtual interface device will classify them according to different services required by the subscribers and choose corresponding processing for them. Different processing corresponds to different rules in the rule database 850. The control interface unit controls the virtual interface processing unit 800 to classify the data frames according to the orders from the control interface and searches for corresponding rules stored in the rule database 850 to process the data. Data frames output from the device are transferred to corresponding device interface after classified in the virtual interface device. Because the virtual interface device stores N rules, the mapping relationship between the device interface and those rules is 1:N. The rules in the virtual interface device may be set up or deleted dynamically. Therefore, it is easy to modify the rules to enhance the adaptability of the system according to the subscribers' requirements and the updating of the system. The device also comprises a software loader (not shown) to load different software.

As the processing center, the virtual interface processing unit 800 is responsible for processing data frames; the processing steps and processing logic in the virtual interface processing unit are firmware and cannot be modified during operation of the system. The rule database is the control center and is responsible for providing relevant processing and control parameters when the virtual interface processing unit processes the data frames. Different parameters lead to corresponding processing behaviors. During operation of the system, the rules in the rule database may be updated. The control interface unit provides an external control interface. Via the control interface, the control system of the device may monitor the virtual interface processing unit and performs adding, deleting, editing, and querying operations to rules in the rule database. The rule database may store a plurality of rules, each of which contains five parts: device interface number, data frame type number, data frame address offset, data frame type value, and data frame comparison mask.

The virtual interface device is connected to the UNIs or the NNIs via the device interfaces. The mapping relationship between the UNIs (or NNIs) and the device interfaces is 1:1. The virtual interface device is connected to the data processing and dispatching device via the inter-device interface. The virtual interface device is connected to the control system of the device via the control interface.

Figure 4D:
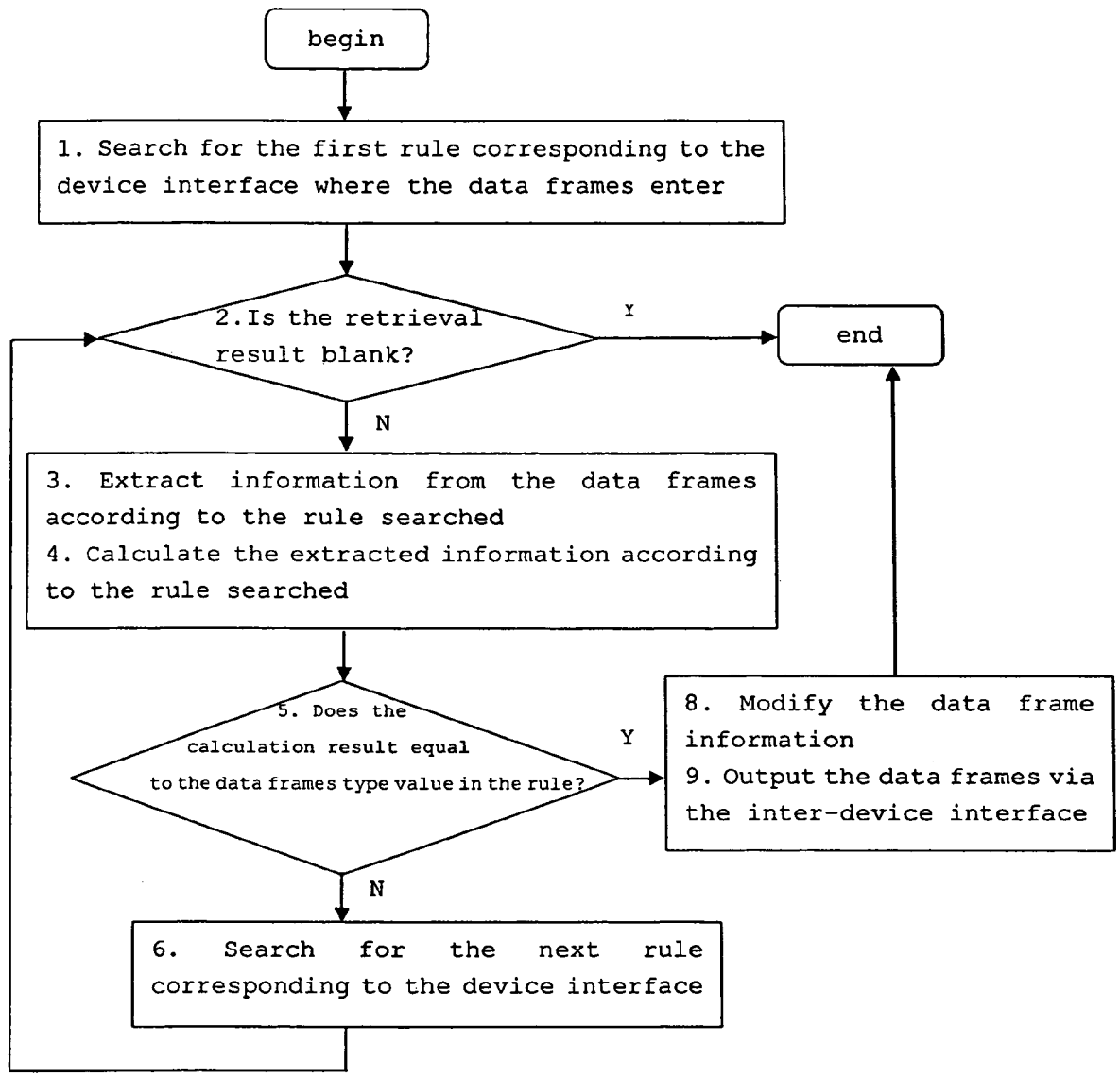
FIG. 4D shows the flowchart of the virtual interface device processing the data entering from the interface of processing device in a preferred embodiment of the system accessing and transmitting Ethernet data frames in a SDH/SONET network according to the present invention.

FIG. 4D shows the steps of the virtual interface processing unit processing data frames entering the virtual interface device via the device interface:

Step 1: searching for the first rule in the rule database corresponding to the device interface with the index of the device interface number;

Step 2: determining the searching result; if it is blank, discarding the data frames and going to step 10;

Step 3: reading information at address offset of the data frame according to the data frame address offset in the rule;

Step 4: performing "AND" operation between the read information and data frame comparison mask in the rule;

Step 5: comparing the result of step 4 with the data frame type value in the rule; if they are equal, going to step 8;

Step 6: searching for the next rule corresponding to the device interface in the rule database;

Step 7: going to step 2;

Step 8: modifying the data frame, i.e., inserting data type number information in the rule in the head position of the data frames;

Step 9: transferring the data frames to the data frame processing and dispatching device via the inter-device interface; and Step 10: ending.

Figure 4E:
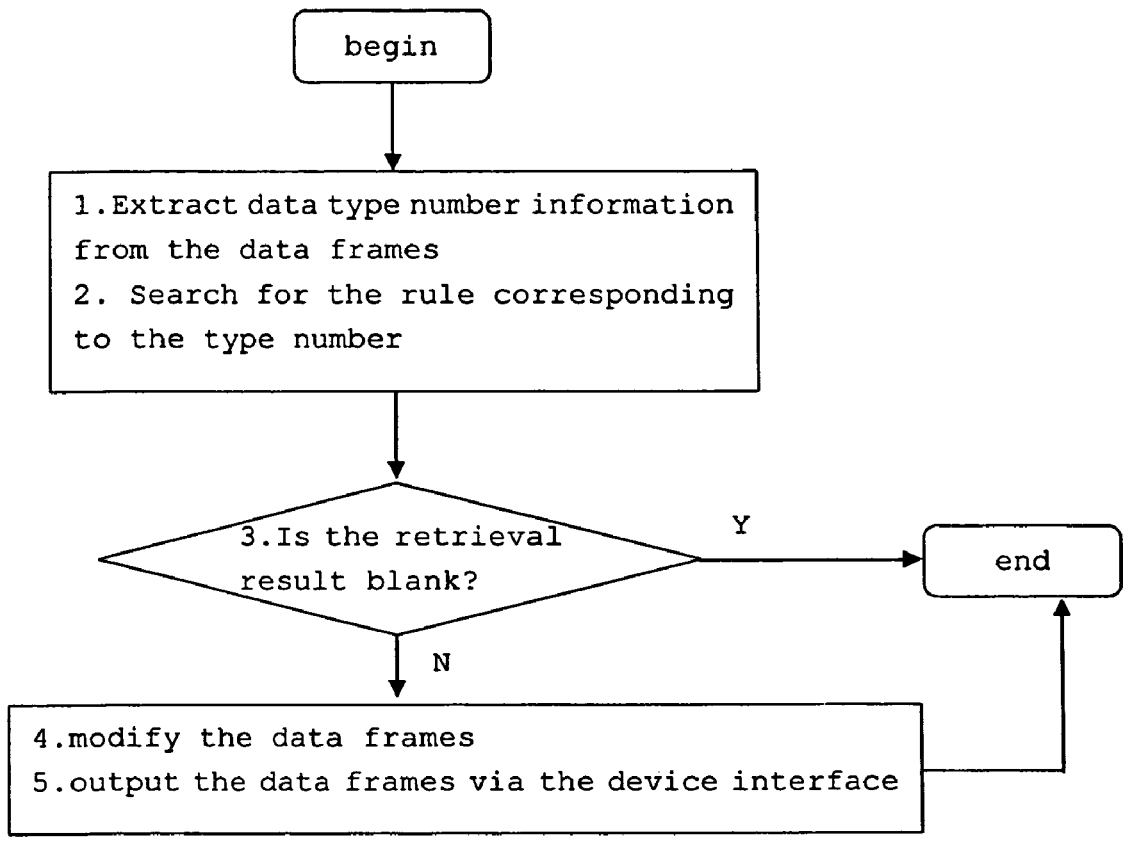
FIG. 4E shows the flowchart of the virtual interface device processing the data entering from the inter-device interface in a preferred embodiment of the system accessing and transmitting Ethernet data frames in a SDH/SONET network according to the present invention.

FIG. 4E shows the steps of the virtual interface processing unit processing data frames entering the virtual interface device via the inter-device interface. The processing steps are as follows:

Step 1: extracting the data frame type information from head position of the data frames;

Step 2: searching in the rule database with the index of data frame type number;

Step 3: determining the searching result; if it is blank, discarding the data frames and going to step 6;

Step 4: modifying the data frames, i.e., deleting the data frame type number information from head position of the data frames;

Step 5: sending the data frames to corresponding device interface according to the device interface number in the rule; and Step 6: ending.

Figure 5A:
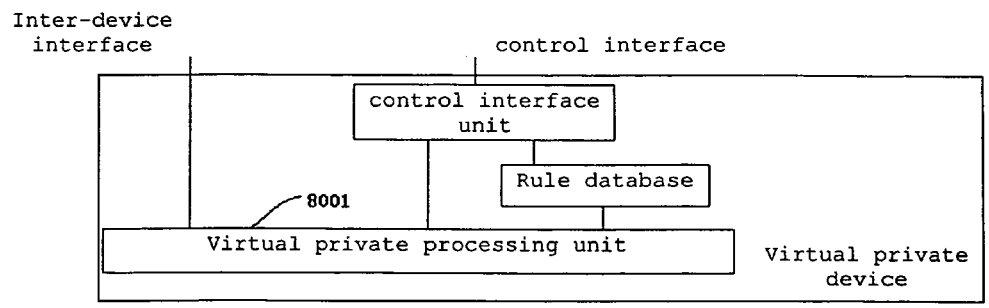
FIG. 5A shows the schematic block diagram of the virtual private device in a preferred embodiment of the system accessing and transmitting Ethernet data frames in a SDH/SONET network according to the present invention.

FIG. 5A shows the schematic block diagram of virtual private device in a preferred embodiment of the system accessing and transmitting Ethernet data frames in a SDH/SONET network according to the present invention. In the virtual private device, a virtual private processing unit 8001 is coupled with the inter-device interface to process the data from the inter-device interface. The virtual private processing unit 8001 is also coupled to the rule database and the control interface unit. The control interface unit exchanges data with outside world via the control interface.

The present invention enhances converging ability of the system through utilizing the virtual private device. The virtual private device stores converging rules, deconverging rules, and relay rules (the relay rules are optional and unnecessary in some simple virtual private devices). The mapping relationship between data types and the rules is 1:1. The rules in the virtual private device can be set up and deleted dynamically. Data frames of different subscribers can be isolated, transmitted and shared by adding a label before sending, changing the label during transmission and removing the label at destination address. A virtual private device comprises a virtual private processing unit and a rule database in it.

The virtual private processing unit has two major functions:

(a) detecting control messages and transferring the control messages to the control system of the device via the control interface unit; and (b) performing convergence, deconvergence, or relay operation for data frames except for the control messages.

The virtual private processing unit is the processing center of the device; the following items are stored in the virtual private processing unit as firmware:

(a) format of control messages;

(b) processing steps and logic for data frames; and (c) format of rules in the rule database.

As the control center, the rule database controls the processing action of the virtual private processing unit. The rules in the rule database may be updated dynamically. The rule database may store a plurality of rules, each of which comprises the following information: input data frame type number, rule type (convergence/deconvergence/relay), label number, and output data frame type number.

The virtual private device is connected to the data processing and dispatching device via the inter-device interface, and the virtual private device is connected to the control system of the device via the control interface.

There are different technical schemes to implement the virtual private device. However, the data frames processing steps and logic in the virtual private processing unit is identical under these schemes. The main differences between these schemes are:

(a) format of rules in the rule database, for example, length and position of label in the rule are different; and (b) format of control messages processed in the virtual private processing unit.

In view of expandability and compatibility, it is recommended to implement the virtual private device with MPLS, GFP, VMAN, or Nested VLAN technique. The device manufacturers may also employ self-defined label formats (or self-defined data frame packets) to implement the virtual private device. The system may support a plurality of virtual private devices implemented with different technical schemes.

Figure 5B:
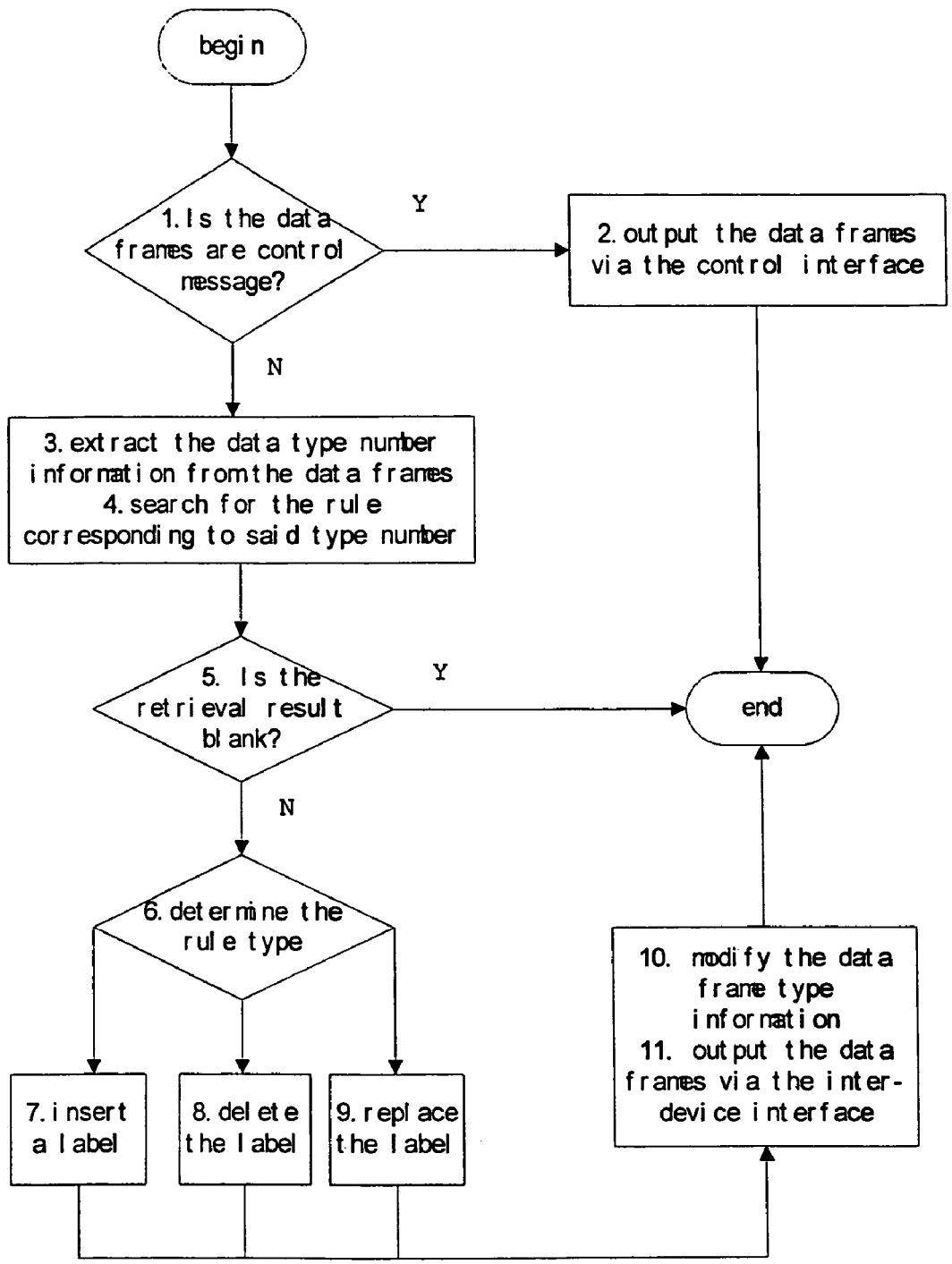
FIG. 5B shows the flowchart of the virtual private device processing the data entering from the inter-device interface in a preferred embodiment of the system accessing and transmitting Ethernet data frames in a SDH/SONET network according to the present invention.

FIG. 5B shows the flowchart of the virtual private processing; for data frames entering the device via the inter-device interface, the processing steps of the virtual private processing unit are as follows:

Step 1: determining whether the data frames are control messages; if yes, going to step 3;

Step 2: transferring the data frames to an external control system via the control interface unit, and then going to step 12;

Step 3: extracting the input data type number information from the head position of the data frames;

Step 4: searching in the rule database with the index of the input data type number information;

Step 5: determining the searching result; if it is blank, discarding the data frames and going to step 12;

Step 6: determining the rule type; if it is a convergence rule, going to step 7; if it is a deconvergence rule, going to step 8; if it is a relay rule, going to step 9;

Step 7: modifying the data frames, i.e., inserting a label number defined in the rule at a special position in the data frames, and then going to step 10;

Step 8: modifying the data frame, i.e., removing the label number at the special position in the data frames, and then going to step 10;

Step 9: modifying the data frames, i.e., replacing the label number at the special position in the data frames with a label number defined in the rule;

Step 10: modifying the data frames, i.e., replacing the data type number at the head position of the data frames with the output data type number defined in the rule;

Step 11: transferring the data frames to the data frame processing and dispatching device via the inter-device interface; and Step 12: ending.

Figure 6A:
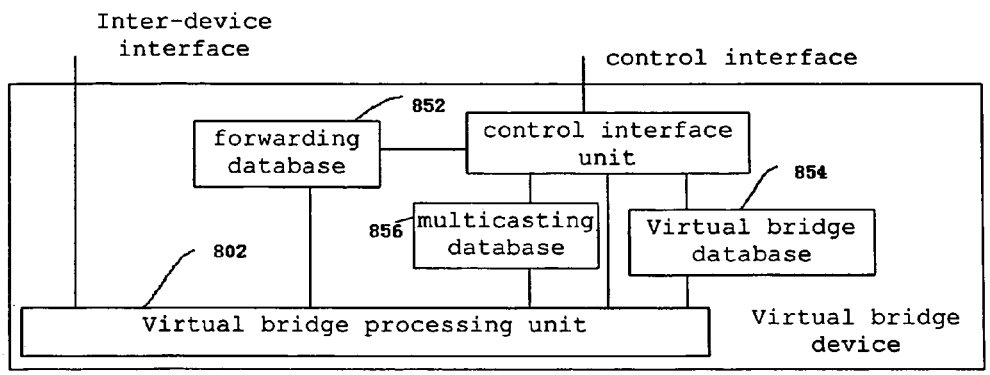
FIG. 6A shows the schematic block diagram of the virtual bridge device in a preferred embodiment of the system accessing and transmitting Ethernet data frames in a SDH/SONET network according to the present invention.

FIG. 6A shows the schematic block diagram of a virtual bridge device in a preferred embodiment of the system accessing and transmitting Ethernet data frames in a SDH/SONET network according to the present invention. The present invention overcomes the issue of limited Ethernet data frame address space through a virtual bridge device. A virtual bridge device may provide a plurality of virtual bridges. Each virtual bridge possesses all features and properties of the bridge device. However, it is different from the bridge device in that the virtual bridge may be set up and deleted dynamically. During operation of the system, the operator may set up or delete a plurality of virtual bridges dynamically because each virtual bridge has an independent address space. The operator may provide VLAN services to subscribers with different virtual bridges, if that conflict exists among address spaces.

The operator may configure a virtual bridge just like a physical bridge. The virtual bridge further expands the features of physical bridge to support VMAN-based switching operation. A virtual bridge device comprises a virtual bridge processing unit 802, a multicasting database 856, a control interface unit, a forwarding database 852, and a virtual bridge database 854.

The virtual bridge processing unit has three major functions:

(a) detecting control messages and transferring the control messages to the control system of the device via the control interface unit;

(b) learning addresses, and storing the knowledge acquired into the forwarding database; and (c) performing switching for data frames except for control messages and modifying data type information in the data frames.

The virtual bridge processing unit is the processing center of the device, and there are five items embedded therein:

(a) format of control messages;

(b) processing steps and logic for data frames;

(c) format of forwarding items in the forwarding database;

(d) format of multicasting items in the multicasting database; and (e) format of items in the virtual bridge database.

The virtual bridge database, multicasting database, and forwarding database control the processing behaviors of the virtual bridge processing unit, and the items in them may be updated during operation of the system. The data formats of items in the multicasting database items and forwarding database are identical, and each item contains the following information:

(a) virtual bridge number;

(b) input port of virtual bridge;

(c) destination address input;

(d) VLAN serial number input;

(e) VMAN serial number input; and (f) output port of virtual bridge.

In the multicasting database, the database code is the combination of all fields. In the forwarding database, the database code is the combination of all fields except for output port of virtual bridge.

Each item in the virtual bridge database contains the following information:

(a) type number input;

(b) virtual bridge number;

(c) port number; and (d) type number output.

Via the control interface, an external control system may implement the following functions:

(a) performing adding, deleting, editing, and querying operations to items in the database; and (b) monitoring the working state of the virtual bridge processing unit.

The virtual bridge device is connected to the data processing and dispatching device via the inter-device interface. The virtual bridge device is connected to the control system of the device via the control interface.

Figure 6B:
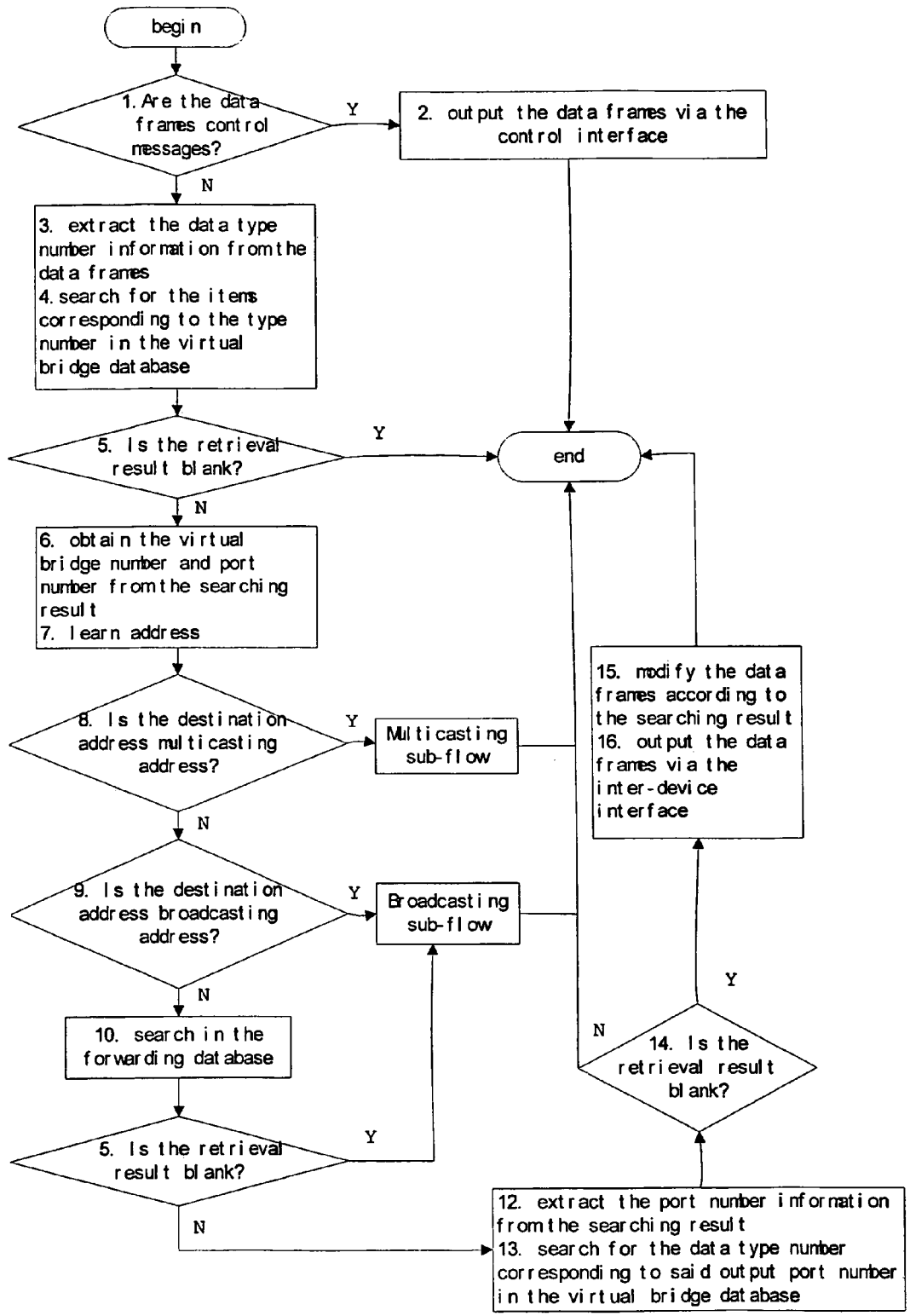
FIG. 6B shows the flowchart of the virtual bridge device processing the data entering from the inter-device interface in a preferred embodiment of the system accessing and transmitting Ethernet data frames in a SDH/SONET network according to the present invention.

FIG. 6B shows the flowchart of the virtual bridge device processing the data entering the inter-device interface in a preferred embodiment of the system accessing and transmitting Ethernet data frames in a SDH/SONET network according to the present invention. For data frames entering the device via the inter-device interface, the virtual bridge processing unit performs the following processing steps:

Step 1: determining whether the data frames are control messages; if yes, going to step 3;

Step 2: transferring the data frames to an external control system via the control interface unit, and then going to step 17;

Step 3: extracting input data type number, destination address, source address, VLAN number, and VMAN number (optional) from a fixed position in the data frames;

Step 4: searching in the virtual bridge database with the index of the data type number extracted;

Step 5: determining the searching result; if it is blank, discarding the data frames and going to step 17;

Step 6: obtaining the virtual bridge number and port number information from the searching result;

Step 7: learning the source address, and then updating the forwarding database according to the learning result;

Step 8: determining whether the destination address is a multicasting address; if yes, executing a multicasting sub-flow, and then going to step 17;

Step 9: determining whether the destination address is a broadcast address, if yes, executes a broadcasting sub-flow, and then going to step 17;

Step 10: searching in the forwarding database with the index of virtual bridge number, input port, and destination address, VLAN number, and VMAN number (optional);

Step 11: determining the searching result; if it is blank, executing a broadcasting sub-flow, and then going to step 17;

Step 12: extracting output port number from the searching result;

Step 13: searching in the virtual bridge database with the index of the virtual bridge number and the output port number;

Step 14: determining the searching result; if it is blank, discarding the data frames and going to step 17;

Step 15: extracting output type number from the searching result and modifying the data frame, i.e., replacing the type number in the data frames with the output data type number;

Step 16: outputting the modified data frames via the inter-device interface; and Step 17: ending.

Figure 6C:
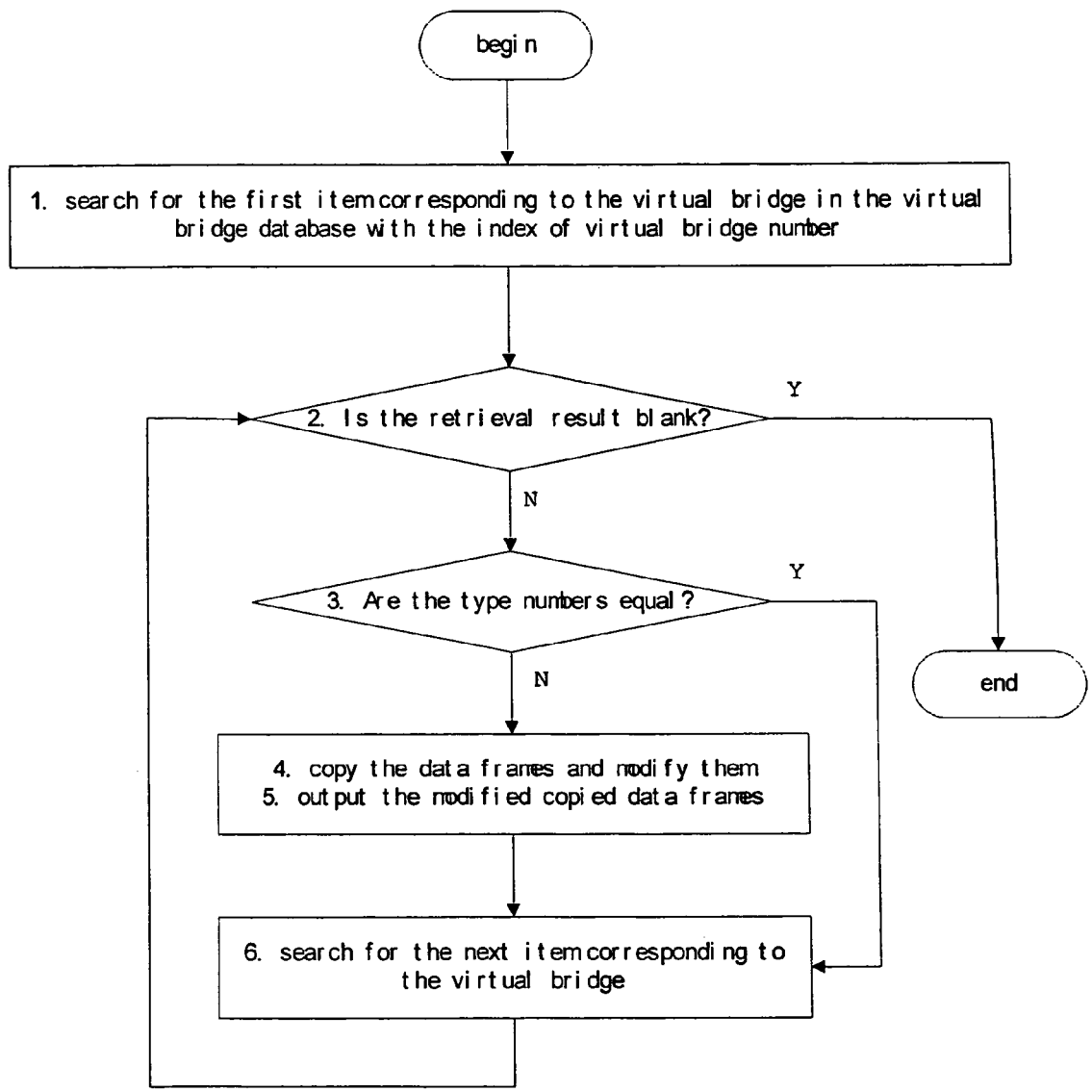
FIG. 6C shows the flowchart of the broadcasting sub-flow of the virtual bridge device processing the data entering from the inter-device interface in a preferred embodiment of the system accessing and transmitting Ethernet data frames in a SDH/SONET network according to the present invention.

FIG. 6C shows the flowchart of broadcasting sub-flow of virtual bridge device processing data from inter-device interface in a preferred embodiment of the system of accessing and transmitting Ethernet data frames in a SDH/SONET network according to the present invention. The processing steps of the broadcasting sub-flow are as follows:

Step 1: searching for the first item corresponding to the virtual bridge in the virtual bridge database with the index of the virtual bridge number;

Step 2: determining the retrieval result; if it is blank, discarding the data frames and going to step 7;

Step 3: comparing the input type number in the retrieval result with the type number in the data frames; if they are equal, going to step 6;

Step 4: copying the data frames, extracting output type number information from the retrieval result, and then modifying the copied data frames, i.e., replacing the type number in the copied data frames with the output type number;

Step 5: outputting the modified copied data frames via the inter-device interface;

Step 6: searching for the next item corresponding to the virtual bridge in the virtual bridge database with the index of virtual bridge number, then going to step 2;

Step 7: the sub-flow ending.

Figure 6D:
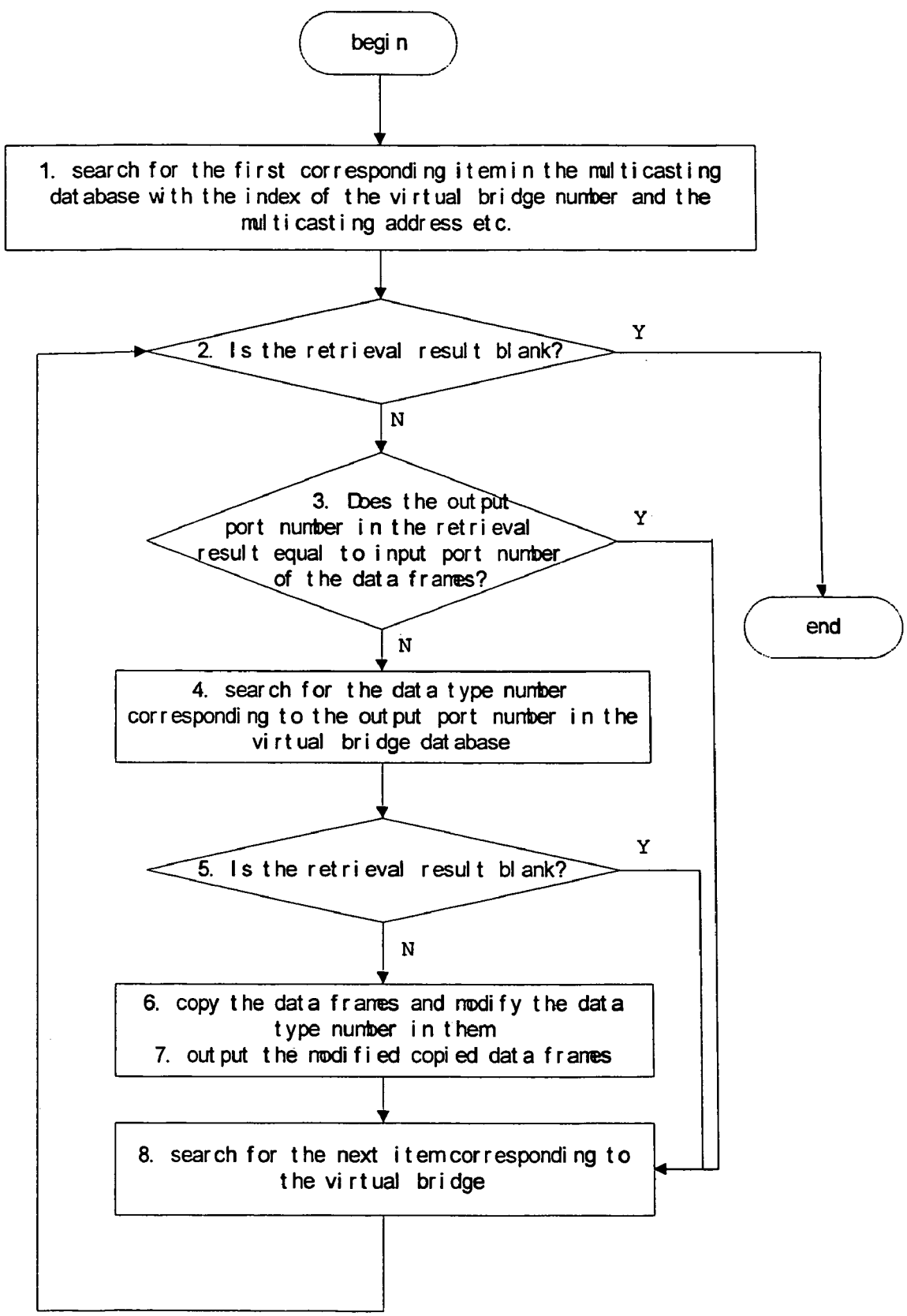
FIG. 6D shows the flowchart of the multicasting sub-flow of the virtual bridge device processing the data entering from the inter-device interface in a preferred embodiment of the system accessing and transmitting Ethernet data frames in a SDH/SONET network according to the present invention.

FIG. 6D shows the flowchart of multicasting sub-flow of virtual bridge device processing data from inter-device interface in a preferred embodiment of the system of accessing and transmitting Ethernet data frames in a SDI/SONET network according to the present invention. The processing steps of the multicasting sub-flow are as follows:

Step 1: With the index of virtual bridge number, input port number, destination address, VLAN number, and VMAN number (optional), searches for the first item corresponding to these key words in the multicasting database;

Step 2: determining the retrieval result; if it is blank, discarding the data frames and going to step 9;

Step 3: comparing the output port number in the retrieval result to the extracted input port number (the input port number corresponding to the type number of the data frames in the virtual bridge database); if they are equal, going to step 8;

Step 4: searching in the virtual bridge database with the index of virtual bridge number and output port number;

Step 5: determining the retrieval result; if it is blank, discarding the data frames and going to step 8;

Step 6: copying the data frames, extracts output type number information from the retrieval result, and then modifying the copied data frames, i.e., replacing the type number in the copied dataframes with the output type number;

Step 7: outputting the modified copied data frames via the inter-device interface;

Step 8: with the index of virtual bridge number, input port number, destination address, VLAN number, and VMAN number (optional), searching for the next item corresponding to these key words in the multicasting database, then going to step 2; and, Step 9: the sub-flow ending.

In the application of the system, The operator may utilize the system shown in FIG. 4A to provide subscribers Ethernet services, which correspond to combinations of processing flows. The operator may define and choose required processing flow combinations flexibly according to network topology, the subscribers' service demands and bandwidth resource. Processing flow combinations common used are as follows:

Processing flow combination 1:
(1) the virtual interface device classifies the data frames; and
(2) the virtual interface device outputs the data frames to corresponding device interfaces.

Processing flow combination 2:
(1) the virtual interface device classifies the data frames;
(2) the virtual bridge device switches the data frames; and
(3) the virtual interface device outputs the data frames to corresponding device interfaces.

Processing flow combination 3:
(1) the virtual interface device classifies the data frames;
(2) the virtual private device processes the data frames (relay, converge, or deconverge); and (3) the virtual interface device outputs the data frames to corresponding device interfaces.

Processing flow combination 4:
(1) the virtual interface device classifies the data frames;
(2) the RPR device processes the data frames (terminates, relays, or starts data frame transmission); and
(3) the virtual interface device outputs the data frames to corresponding device interfaces.

Processing flow combination 5:
(1) the virtual interface device classifies the data frames;
(2) the virtual bridge device switches the data frames;
(3) the virtual private device converges the data frames; and
(4) the virtual interface device outputs the data frames to corresponding device interfaces.

Processing flow combination 6:
(1) the virtual interface device classifies the data frames;
(2) the virtual private device deconverges the data frames;
(3) the virtual bridge device switches the data frames; and
(4) the virtual interface device outputs the data frames to corresponding device interfaces.

Processing flow combination 7:
(1) the virtual interface device classifies the data frames;
(2) the virtual private device deconverges the data frames;
(3) the virtual bridge device switches the data frames; and
(4) the virtual private device converges the data frames;
(5) the virtual interface device outputs the data frames to corresponding device interfaces.

Processing flow combination 8:
(1) the virtual interface device classifies the data frames;
(2) the RPR device terminates sending the data frames;
(3) the virtual bridge device switches the data frames; and
(4) the virtual interface device outputs the data frames to corresponding device interfaces.

Processing flow combination 9:
(1) the virtual interface device classifies the data frames;
(2) the virtual bridge device switches the data frames;
(3) the RPR device begins to send the data frames; and
(4) the virtual interface device outputs the data frames to corresponding device interfaces.

Processing flow combination 10:
(1) the virtual interface device classifies the data frames;
(2) the RPR device terminates sending the data frames;
(3) the virtual bridge device switches the data frames;
(4) the RPR device begins to send the data frames; and
(5) the virtual interface device outputs the data frames to corresponding device interfaces.

Processing flow combination 11:
(1) the virtual interface device classifies the data frames
(2) the virtual private device converges the data frames;
(3) the RPR device begins to send the data frames; and
(4) the virtual interface device outputs the data frames to corresponding device interfaces.

Processing flow combination 12:
(1) the virtual interface device classifies the data frames;
(2) the RPR device terminates sending the data frames;
(3) the virtual private device deconverges the data frames; and
(4) the virtual interface device outputs the data frames to corresponding device interfaces.

Processing flow combination 13:
(1) the virtual interface device classifies the data frames;
(2) the RPR device terminates sending the data frames;
(3) the virtual private device relays the data frames;
(4) the RPR device begins to send the data frames; and
(5) the virtual interface device outputs the data frames to corresponding device interfaces.

Processing flow combination 14:
(1) the virtual interface device classifies the data frames;
(2) the RPR device terminates sending the data frames;
(3) the virtual private device deconverges the data frames;
(4) the virtual bridge device switches the data frames; and
(5) the virtual interface device outputs the data frames to corresponding device interfaces.

Processing flow combination 15:
(1) the virtual interface device classifies the data frames;
(2) the virtual bridge device switches the data frames;
(3) the virtual private device converges the data frames;
(4) the RPR device begins to send the data frames; and
(5) the virtual interface device outputs the data frames to corresponding device interfaces.

Processing flow combination 16:
(1) the virtual interface device classifies the data frames;
(2) the RPR device terminates sending the data frames;
(3) the virtual private device deconverges the data frames;
(4) the virtual bridge device switches the data frames;
(5) the virtual private device converges the data frames;
(6) the RPR device begins to send the data frames; and
(7) the virtual interface device outputs the data frames to corresponding device interfaces.

Processing flow combination 17:
(1) the virtual interface device classifies the data frames;
(2) the virtual private device deconverges the data frames;
(3) the RPR device terminates sending the data frames; and
(4) the virtual interface device outputs the data frames to corresponding device interfaces.

Processing flow combination 18:
(1) the virtual interface device classifies the data frames;
(2) the RPR device begins to send the data frames;
(3) the virtual private device converges the data frames; and
(4) the virtual interface device outputs the data frames to corresponding device interfaces.

Processing flow combination 19:
(1) the virtual interface device classifies the data frames;
(2) the virtual private device deconverges the data frames;
(3) the RPR device relays the data frames; and
(5) the virtual interface device outputs the data frames to corresponding device interfaces.

Processing flow combination 20:
(1) the virtual interface device classifies the data frames;
(2) the virtual private device deconverges the data frames;
(3) the RPR device terminates sending the data frames;
(4) the virtual bridge device switches the data frames; and
(5) the virtual interface device outputs the data frames to corresponding device interfaces.

Processing flow combination 21:
(1) the virtual interface device classifies the data frames;
(2) the virtual bridge device switches the data frames;
(3) the RPR device begins to send the data frames;
(4) the virtual private device converges the data frames; and
(5) the virtual interface device outputs the data frames to corresponding device interfaces.

Processing flow combination 22:
(1) the virtual interface device classifies the data frames;
(2) the virtual private device deconverges the data frames;
(3) the RPR device terminates sending the data frames;
(4) the virtual bridge device switches the data frames;
(5) the RPR device begins to send the data frames;
(6) the virtual private device converges the data frames; and
(7) the virtual interface device outputs the data frames to corresponding device interfaces.

When implementing functions of the system, the device manufacturers may partially or completely employ above method. For devices with simple functions, partial components can be omitted and the processing is relatively simple. The device manufacturers may even treat the processing as firmware through fixing connections among the devices to omit the data processing and dispatching device. For instance, for a device that only provides Ethernet private service, it may only comprises the following devices:

(1) one or more UNIs;
(2) one or more NNIs and mapping/demapping devices;
(3) a virtual interface device; and
(4) a virtual private device.

The device supports the following processing flow combinations:

(1) processing flow combination 1; and
(2) processing flow combination 3.

With the system and method of the present invention, integral VLAN services can be provided for subscribers. The system and method in the present invention overcome the restriction on Ethernet data frame address space at UNIs. When a plurality of Ethernet data frames is sent to such a network device, there is no restriction on address space of Ethernet data frames.

With the system and method of the present invention, a device interface (UNI or NNI) supports both VLAN service and Ethernet private service, and a plurality of Ethernet data frames from many subscribers can be accessed and converged at a single device interface, thus the accessing and converging capability of the device is enhanced greatly.

With the system and method of the present invention, the operator may maximize processing capacity of its equipments and utilization ratio of bandwidth resource through flexible adjustment to internal processing flows according to network topology, the subscribers' service demands, and bandwidth resource.

With the system and method of the present invention, individualized services can be quickly provided for subscribers. The operator may provide new services to subscribers through creating new flow combinations, without upgrading or adding new equipment.

According to the present invention, data frames entering the device via device interfaces are processed after classified; and, different data types correspond to different processing flows are implemented by virtual interface devices.

Existing technical schemes and devices have to be implemented on a presumption: data frames from a device interface belong to the same type, and different types of data frames enter the device via different device interfaces. Therefore, in the prior technical scheme and system, data frames entering the device via the same device interface are processed through the same processing flow, thus the mapping relationship between processing flows and device interfaces is 1:n. As a result, if there are many data types, although the processing capacity of the device is sufficient, some services cannot be supported due to lack of free device interfaces.

On the other hand, with the system and method of the present invention, data frames from a device interface may contain various types, and processing flows for different types of data frames are different; the mapping relationship between processing flows and device interfaces is m:n.

In addition, the present invention supports free combination of processing flows; the combination of data processing and dispatching device, and its processing flows is an important part of the present invention.

Existing technical schemes and devices have no data processing and dispatching device and only support several fixed processing flows. As the result, they are lacked of flexibility and resiliency. However, the requirements of operators for equipment are changing.

A system lacking of flexibility and resiliency is unable to adapt to changing environment. With the present invention, the operator can update the processing flows dynamically, and subscribers can choose appropriate flow combinations or create new flow combinations as required. As previously discussed, there are 22 or more processing flow combinations available.

In existing technical schemes and devices, the amount of bridge devices is certain; so conflicts among data frame address spaces of different subscribers can be avoided only through restricting the data frame address spaces of subscribers. On the other hand, the virtual bridge devices in the present invention support dynamical expansion (i.e., add new virtual bridges), and the address space of each virtual bridge is independent; different virtual bridges correspond to different subscribers; hence the present invention has no restriction to data frame address spaces of subscribers.

In addition, data frames of different subscribers can be isolated, transmitted and shared by adding a label before sending, changing the label during transmission and removing the label at destination address, thus the virtual private device of the present invention is achieved.

Although the present invention is described with reference to above embodiments, it is understood that any skilled in this field can easily make any change and modification without escaping the spirit of the present invention. So any change and modification should be in the scope of the present invention.

What is claimed is:

1. A system for accessing and transmitting data frames of different types in a digital transmission network, comprising:
    at least one user-network interface coupled with a user-network;
    at least one network-network interface coupled with the digital transmission network to transfer data;
    at least one mapping/demapping device;
    a virtual interface device coupled with said at least one user-network interface and with said at least one network-network interface via said at least one mapping/demapping device; and
    a control device coupled with said virtual interface device to control other corresponding devices to perform different types of data frame processing flows, said control device comprising:
    a data processing and dispatching device, comprising:
    at least one inter-device interface for inputting and outputting data frames;
    a data processing and dispatching unit coupled with said inter-device interface for inputting and outputting data frames;
    a processing flow database, storing a plurality of processing flows, coupled with said data processing and dispatching unit, wherein each processing flow comprises data frame type number and inter-device interface number; and
    a control interface unit coupled with said processing flow database and said data processing and dispatching unit so as to control a virtual private processing unit and a rule database to process the data frames;
    wherein said data processing and dispatching device is adapted to:
    extract type number from received data frames;
    search for corresponding processing flows in said processing flow database corresponding with the extracted type number;

determine the retrieval result, discarding the data frames if it is blank and ending the process;

if the search result is not blank, then an inter-device interface number is extracted from the search result; and the data frames are output via the inter-device interface with said inter-device interface number; and wherein the correspondence between said processing flows and data frame types is 1:1, and the data processing and dispatching unit is adapted to find the corresponding processing flows according to the data frame types and informs said corresponding devices to process the data frames according to the corresponding processing flows.

2. A system according to claim 1, wherein said other corresponding devices comprise: at least one of virtual private device, virtual bridge device and resilient packet ring device coupled with said control device.

3. A system according to claim 1, wherein each inter-device interface of said data processing and dispatching device corresponds to a unique external device.

4. A system according to claim 1, wherein the processing flows in said processing flow database are established, modified or deleted dynamically, and wherein data of the processing flows in said processing flow database are added, modified or deleted dynamically during operation.

5. A system according to claim 2, wherein each inter-device interface of said data processing and dispatching device corresponds to a unique external device.

6. A system according to claim 1, wherein the processing flows in said processing flow database are established, modified or deleted dynamically, and wherein data of the processing flows in said processing flow database are added, modified or deleted dynamically during operation.

* * * * *